US006978054B2

(12) United States Patent
Chiba et al.

(10) Patent No.: US 6,978,054 B2
(45) Date of Patent: Dec. 20, 2005

(54) APPARATUS, SYSTEM, AND METHOD FOR IMAGE READING, AND COMPUTER-READABLE RECORDING MEDIUM IN WHICH IMAGE READING PROGRAM IS RECORDED

(75) Inventors: Hirotaka Chiba, Kawasaki (JP); Tsugio Noda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 548 days.

(21) Appl. No.: 09/983,787

(22) Filed: Oct. 25, 2001

(65) Prior Publication Data

US 2002/0141662 A1 Oct. 3, 2002

(30) Foreign Application Priority Data

Mar. 27, 2001 (JP) .............................. 2001-091084

(51) Int. Cl.[7] .............................................. G06E 1/02
(52) U.S. Cl. ...................... 382/313; 382/232; 358/473
(58) Field of Search ........................ 382/107, 232–253, 382/312–324; 358/473

(56) References Cited

U.S. PATENT DOCUMENTS 4,866,535 A * 9/1989 Kubota et al. ............... 358/474
4,949,391 A * 8/1990 Faulkerson et al. .......... 382/313
6,527,182 B1 * 3/2003 Chiba et al. ............. 235/462.11

FOREIGN PATENT DOCUMENTS

JP        2000-349984        12/2000        ............ H04N 1/07

* cited by examiner

Primary Examiner—Joseph Mancus
Assistant Examiner—Dennis Rosario
(74) Attorney, Agent, or Firm—Westerman, Hattori, Daniels & Adrian, LLP

(57) ABSTRACT

An image reading apparatus including an image reading section, an amount-of-movement detecting thinning out the transfer data other than particular transfer data, each of successive transfer data pieces at a time, adding the amount of movement, which is contained in the thinned-out transfer data, to the amount of movement, which is contained in the particular transfer data, and generating compressed data composed of the image data in the particular transfer data and the added amount of movement, and a data transferring section for transferring one of the transfer data and the compressed data to a destination. With such image reading apparatus, not only the image is reproduced free from shortage in size in the direction of scanning regardless of the speed of scanning, not only it is possible to reduce an amount of data to be transferred to the destination from the image reading apparatus.

30 Claims, 9 Drawing Sheets

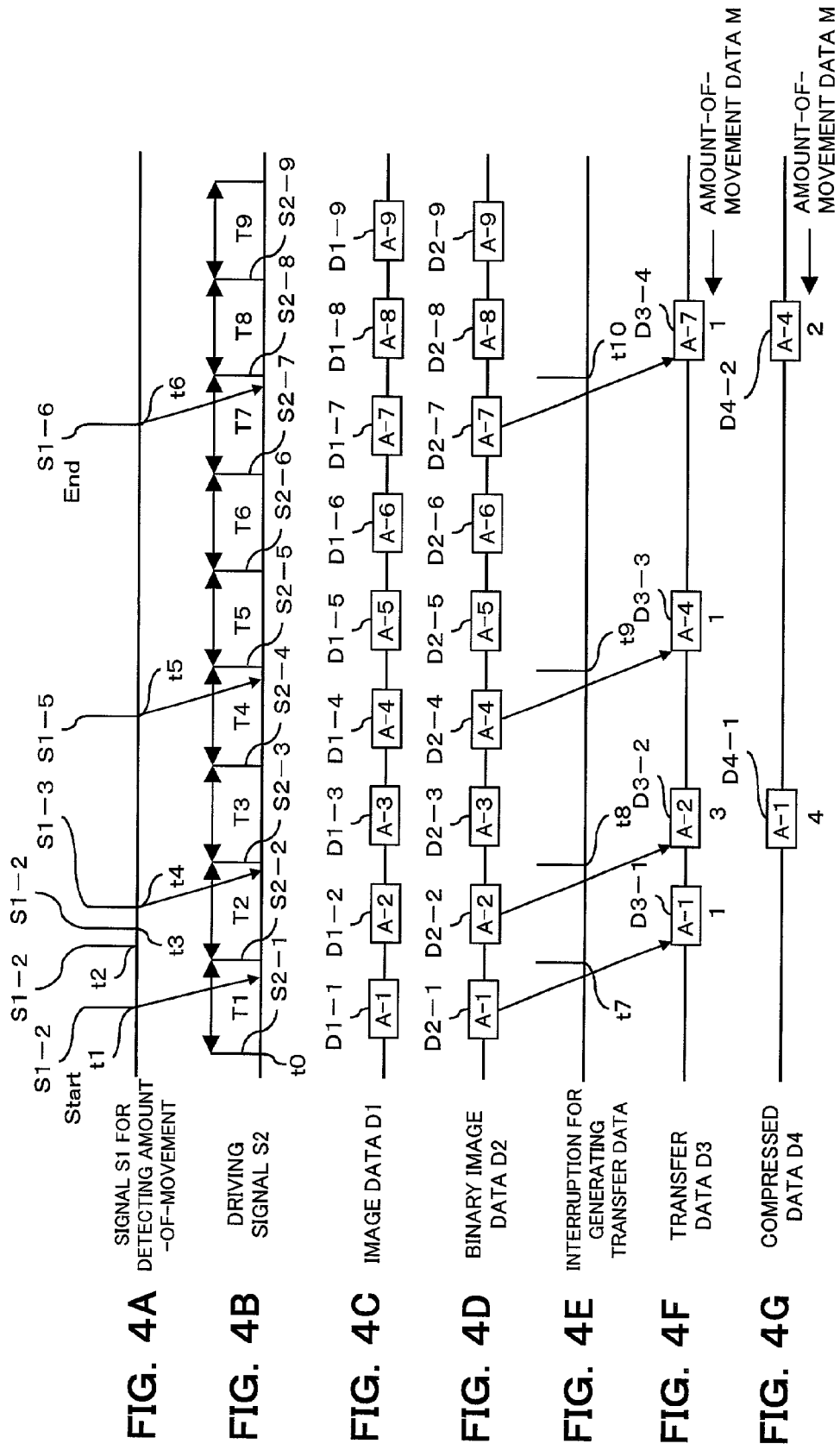

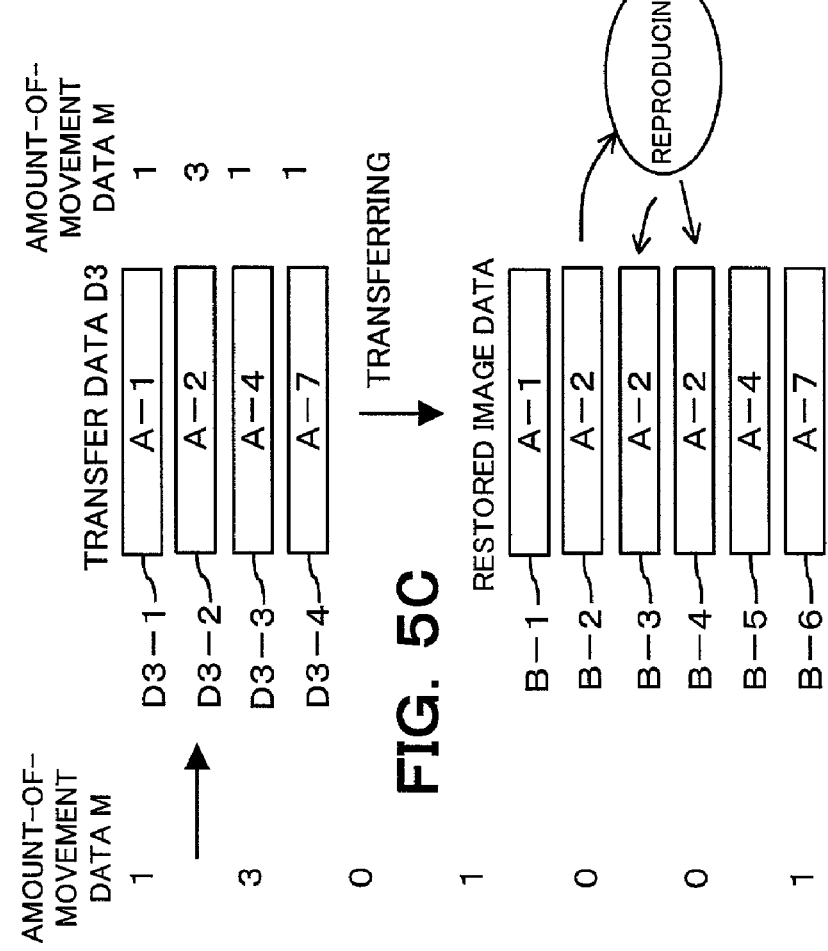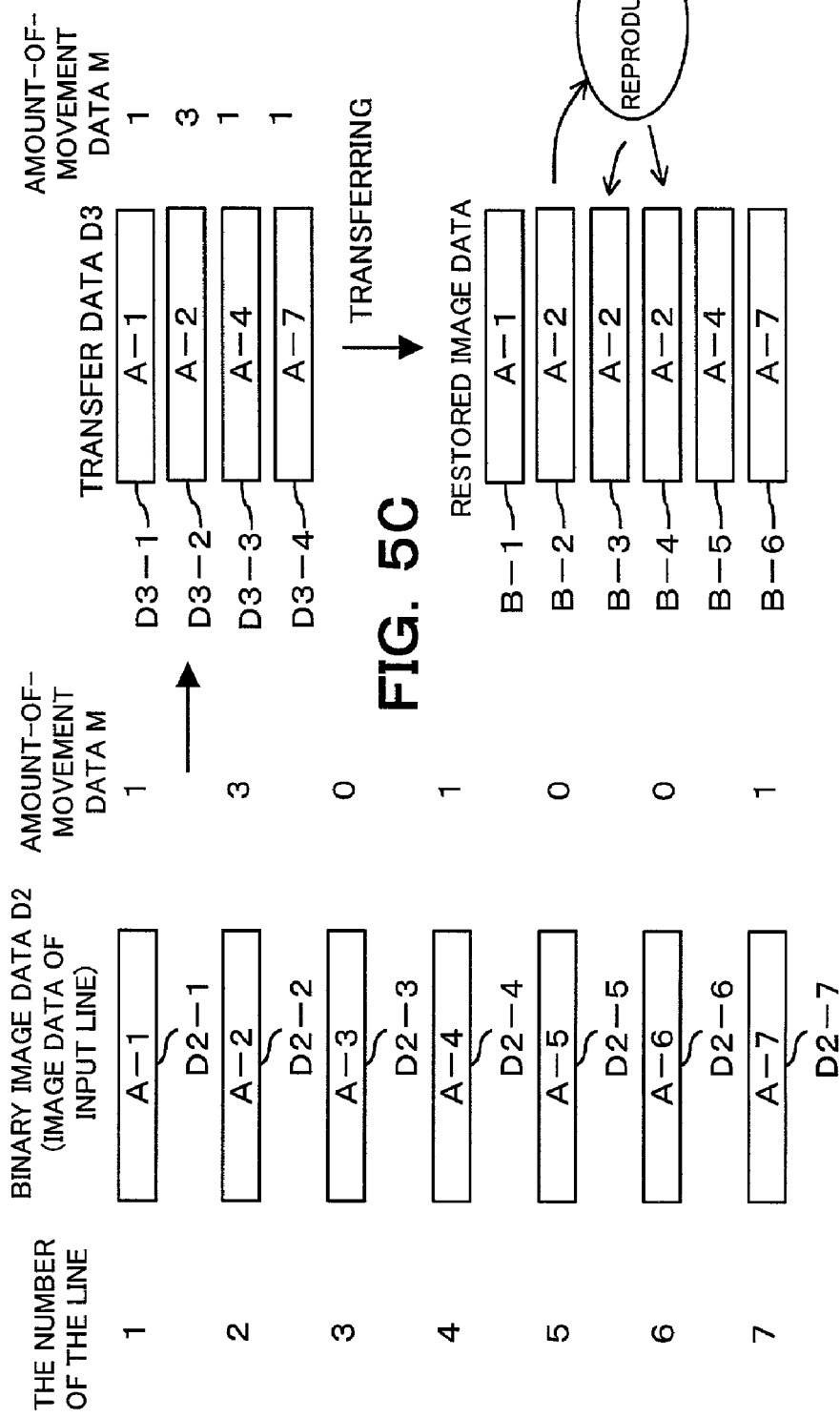

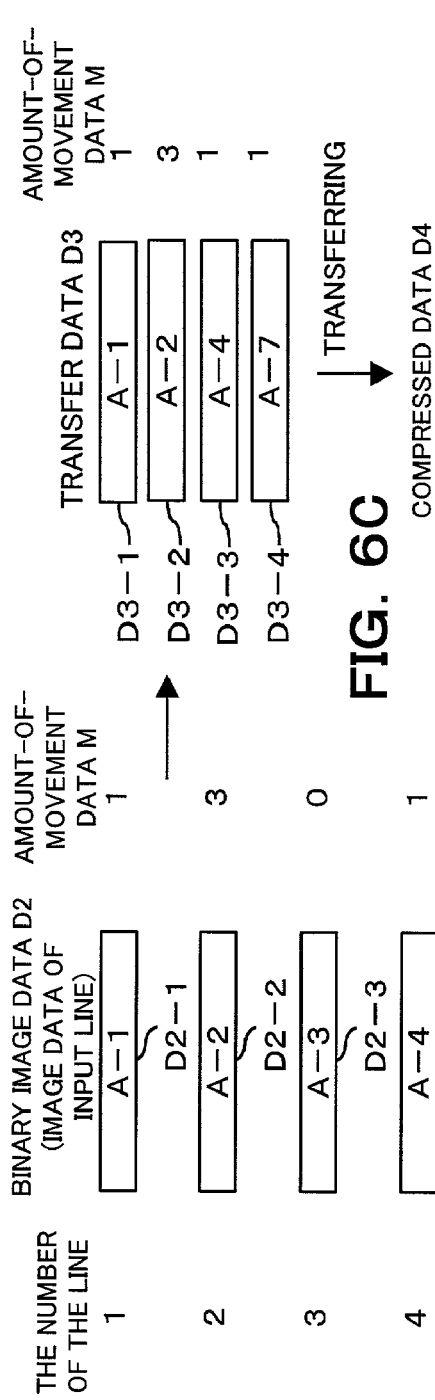
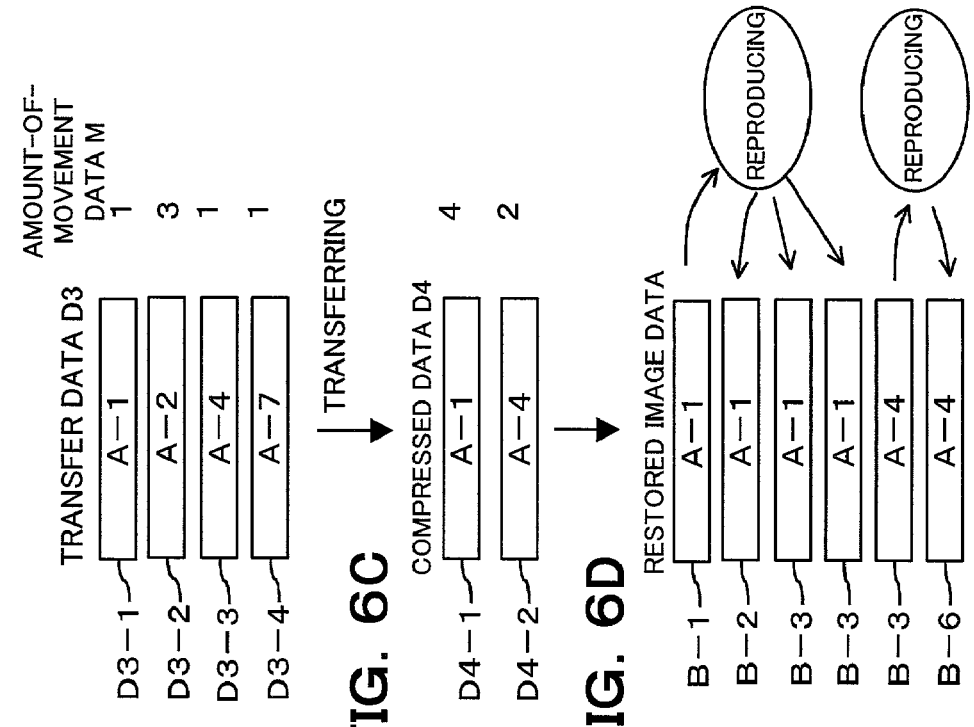
FIG. 6A
FIG. 6B
FIG. 6C
FIG. 6D

APPARATUS, SYSTEM, AND METHOD FOR IMAGE READING, AND COMPUTER-READABLE RECORDING MEDIUM IN WHICH IMAGE READING PROGRAM IS RECORDED

BACKGROUND OF THE INVENTION

1. Field of the Invention

The present invention relates to an apparatus, a system and a method for reading an image borne on a support by a manual operation of an operator, and also relates to a computer-readable recording medium in which an image reading program for realizing the apparatus, the system and the method is recorded. The present invention is particularly useful when applied to a hand-held scanner that reads an image as an operator moves it with respect to a support.

2. Description of the Related Art

In general, scanners that read images borne on supports by scanning the supports are grouped into two types: one type is exemplified by a flatbed scanner and a sheet-fed scanner that reads the image by automatically scanning the support set/fed in the scanner; and the other type is exemplified by a hand-held scanner that reads image by manually scanning the support, namely, as the scanner is moved by operator's hand.

A typical hand-held scanner comprises a scanner unit and a data processing unit. The scanner unit reads an image borne on a support by an operator's manual operation of the scanner unit with respect to the support, and the data processing unit processes the data of the image that has been read by the scanner unit. Specifically, a line sensor in the scanner unit reads the image line by line and detects an amount of relative movement of the scanner unit with respect to the support, whereupon the data processing unit transfers the image data, each data piece being a line of the read image, to information processing equipment, e.g., a computer, installed downstream of the data processing unit in accordance with the detected amount of relative movement of the scanner unit.

Upon receipt of the image data, the information processing equipment restores the read image by fitting all the image data pieces together, each image data piece in a line, thereby generating the two-dimensional image.

Moving the scanner unit on a support by operator's hand causes the hand-held scanner to read an image on the support. If rapid movement (scanning) of the scanner unit by operator's hand makes a cycle of pulse signals for detection of amount of movement of the scanner unit shorter than the cycle of a driving signal of the data processing unit, the image data that is to be transferred to the information processing equipment would skip or fail to pick up data pieces of part of the image. As a result, the image finally restored by the information processing equipment would be short in size in the scanning direction.

As a solution, Japanese Patent Laid-Open (Kokai) publication No. 2000-349984 proposed an image reading apparatus that is equipped with a image data generating section for generating image data in accordance with the scanner unit's amount of movement detected by a rotary encoder (an amount-of-movement detecting section). With this known image reading apparatus, even if the scanner unit is rapidly moved (to scan an image) by operator's hand so as to make a cycle of pulse signals for detection of amount of movement of the scanner unit shorter than the cycle of a driving signal of the data processing unit, the missing portion of the image due to the skipped scanning will be compensated by making one or more copies of the preceding image portion which is contained in the image data and which has been read immediately before the missing portion. Thereby it is possible to reproduce the image without shortage in size in the scanning direction regardless of the scanning speed.

Assuming that an image reading apparatus reads an image with high resolution, an increased amount of data is obtained by the line sensor by the scanner unit, as image data, each data piece corresponding to a line of the image. So the image reading apparatus transfers such an increased amount of data to the information processing equipment to restore the image. For this data transfer, the image reading apparatus requires a high-speed communication interface (hereinafter also called I/F),or a buffer, for temporarily storing data to be transferred to the information processing equipment.

But a high-speed communication I/F is expensive, causing an increase of price of the image reading apparatus. Further, to read an image with a higher resolution needs a larger-capacity buffer, which also would cause an increase of the manufacturing cost of the image reading apparatus.

If the amount of data the image reading apparatus transfers to the information processing apparatus were small, the image reading apparatus not only could have been manufactured with a reasonable cost but also would have guaranteed sure transfer of data.

SUMMARY OF THE INVENTION

With the foregoing problems in view, it is a first object of the present invention to provide an apparatus, a system and a method for image reading that obtain the image to be restored free from shortage in the direction of scanning regardless the speed of scanning and that reduce the size of the data to be transferred to an external apparatus. It is a second object of the present invention to provide a computer-readable recording medium in which a program for reading an image, obtaining the image to be restored free from shortage in the direction of scanning regardless the speed of scanning and reducing the size of the data to be transferred to an external apparatus, is recorded.

As a first generic feature, there is provided an apparatus, and a system for reading an image, and a computer-readable recording medium in which a program for reading an image is recorded, in which the following steps are executed: (a) reading the image in unit line data, which is composed of a predetermined number of lines of the image, for every predetermined time interval while moving the image reading section on the support; (b) detecting an amount of relative movement of the image reading apparatus with respect to the support; (c) generating image data based on the unit line data upon detection of movement of the image reading apparatus in the detecting step (b), obtaining an amount of movement corresponding to the image data based on the amount of relative movement, of the image reading apparatus, detected in the detecting step (b), and generating transfer data composed of the obtained image data and the amount of movement; (d) intermittently thinning out the transfer data other than particular transfer data, each of successive transfer data pieces at a time, adding the amount of movement, which is contained in the thinned-out transfer data, to the amount of movement, which is contained in the particular transfer data, and generating compressed data composed of the image data in the particular transfer data and the added amount of movement; and (e) transferring one of the transfer data, which has been generated in the transfer data generating step (c), and the compressed data, which has been generated in the transfer data thinning-out step (d), to a destination.

As a second generic feature, there is provided a method of reading an image borne on a support using an image reading apparatus, comprising the steps of: (a) reading the image in unit line data, which is composed of a predetermined number of lines of the image, for every predetermined time interval while moving the image reading apparatus on the support; (b) detecting an amount of relative movement of the image reading apparatus with respect to the support; (c) generating image data based on the unit line data upon detection of movement of the image reading apparatus in the detecting step (b), obtaining an amount of movement corresponding to the image data based on the amount of relative movement, of the image reading apparatus, detected in the detecting step (b), and generating transfer data composed of the obtained image data and the amount of movement; (d) intermittently thinning out the transfer data other than particular transfer data, each of successive transfer data pieces at a time, adding the amount of movement, which is contained in the thinned-out transfer data, to the amount of movement, which is contained in the particular transfer data, and generating compressed data composed of the image data in the particular transfer data and the added amount of movement; and (e) transferring one of the transfer data, which has been generated in the transfer data generating step (c), and the compressed data, which has been generated in the transfer data thinning-out step (d), to a destination.

As a third generic feature, there is provided a system for an image borne on a support, comprising: a reading section for reading the image in unit line data, which is composed of a predetermined number of lines of the image, for every predetermined time interval as the image reading section is moved on the support; an amount-of-movement detecting section for detecting an amount of relative movement of the image reading section with respect to the support; a transfer-data generating section for generating image data based on the unit line data upon detection of movement of the image reading section, obtaining an amount of movement corresponding to the obtained image data based on the amount of relative movement, of the image reading section, detected by the amount-of-movement detecting section, and generating transfer data composed of the obtained image data and the amount of movement; a data compressing section for intermittently thinning out the transfer data other than particular transfer data, each of successive transfer data pieces at a time, adding the amount of movement, which is contained in the thinned-out transfer data, to the amount of movement, which is contained in the particular transfer data, and generating compressed data composed of the image data in the particular transfer data and the added amount of movement; a data transferring section for transferring one of the transfer data generated by the transfer data generating section and the compressed data generated by the data compressing section to a destination; and an image restoring section, disposed at the destination the external apparatus) with respect to the data transferring section, for restoring the image by reproducing the image data, in the transfer data or the compressed data, in accordance with the amount of movement in the transfer data or the compressed data.

As a result, it is possible to transfer one of the transfer data or the compressed data to a destination.

As a preferable feature, a state of the transferring may be detected and a mode of the transferring may be switched by the data transferring section in accordance with a result of the detecting by the state-of-transfer detecting section by selecting one from modes consisting of (i) a normal transferring mode in which the transfer data, which has been generated by the transfer-data generating section, is transferred to the destination by the data transferring section, and (ii) a compression transferring mode in which the compressed data, which has been generated by the data compressing section, is transferred to the destination by the data transferring section.

With such detecting and switching, it is possible to transfer one of the transfer data or the compressed data to a destination in accordance with a state of the transferring.

As a second preferable feature, the compression transferring mode may be selected and the compressed data may be transferred to the destination if it is determined that the speed of the transferring is equal to or smaller than the predetermined threshold value.

As another preferable feature, the transfer data or the compressed data in a transfer-data holding section may be temporarily stored in a holding section before the transferring to the destination and a state-of-transferring may be detected based on unoccupied area of the transfer-data holding section. Therefore one of the transferring data or the compressed data is transferred to the destination in accordance with an unoccupied area of the transfer-data holding section.

As still another generic feature, the image may be restored by reproducing the image data in the transferring data or the compressed data in accordance with the amount of movement. As a result, the image is reproduced in accordance with the amount of movement of the image reading apparatus.

The apparatus, system, and method for image reading and computer-readable recording medium in which a program for reading an image of the present invention guarantee the following advantageous results:

(1) since out transfer data D3 other than particular transfer data D3, each of successive transfer data pieces that have been generated by the transfer-data generating section 101 is thinned out and the amount M of movement in the thinned-out transfer data D3 is added to the amount M of movement in the particular transfer data thereby generating compressed data D4 composed of the image data in the particular data D3 and the added amount M of movement, it is possible to reduce an amount of data to be transferred to the destination. The data transferring equipment (the data transferring section) not only well works with a relatively low capacity thereof, but also guarantees sure transfer of data.

(2) Since the detection of a state of transferring of the transfer data or the compressed data switches the mode of transferring by selecting one from the normal transfer mode and the compression transfer mode, it is possible to transfer data to the destination in an optimum mode in accordance with the state of the transferring data.

(3) Since the transfer data or the compressed data in a transfer-data holding section is temporarily stored in a holding section before the transferring to the destination and a state-of-transferring is detected based on unoccupied area of the transfer-data holding section, the detection of the state of transferring is performed with ease. Further, even if the transferring of data get stuck, it is possible to prevent the data to be transferred from overflowing from the transfer-data holding section.

(4) Since, at the destination, the image is restored by reproducing the image data, in the transfer data or the compressed data, in accordance with the amount of movement in the transfer data or the compressed data, it is possible to prevent the image from a reduction in size in the scanning direction regardless of the scanning speed.

Other objects and further features of the present invention will be apparent from the following detailed description when read in conjunction with the accompanying drawings.

BRIEF DESCRIPTION OF THE DRAWINGS

FIGS. 4A through 4G are a series of a time chart illustrating a process performed by a data processing section of the image reading apparatus of FIG. 2;

FIGS. 5A through 5C are diagrams illustrating data generated in a normal transferring mode in the image reading system of FIG. 1;

FIGS. 6A through 6D are diagrams illustrating data generated in a compression transferring mode in the image reading system of FIG. 1;

DESCRIPTION OF THE PREFERRED EMBODIMENTS

Various preferred embodiments of the present invention will now be described with reference to the accompanying drawings.

Figure 1:
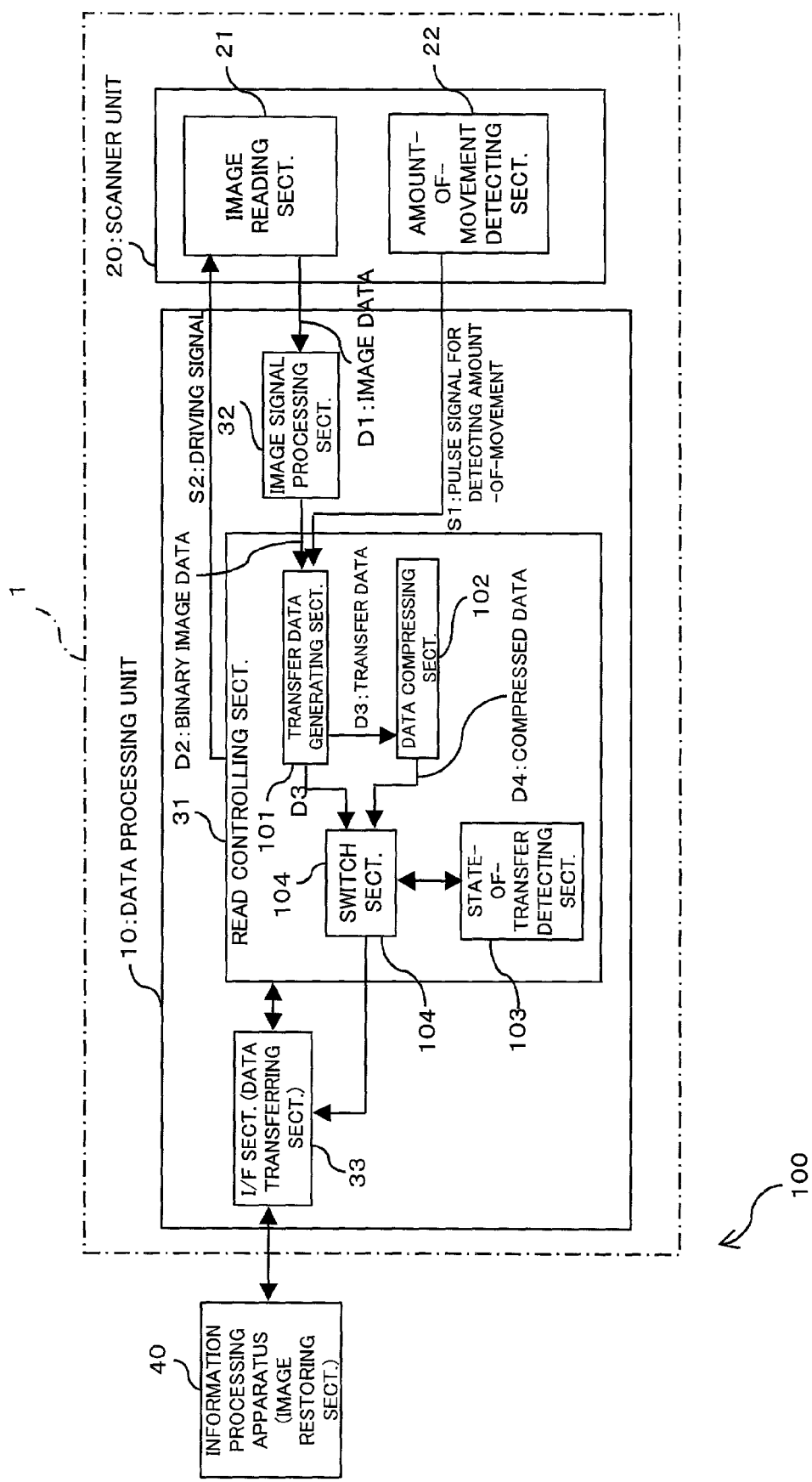
FIG. 1 is a block diagram schematically showing an image reading system according to a first embodiment.
Figure 2:
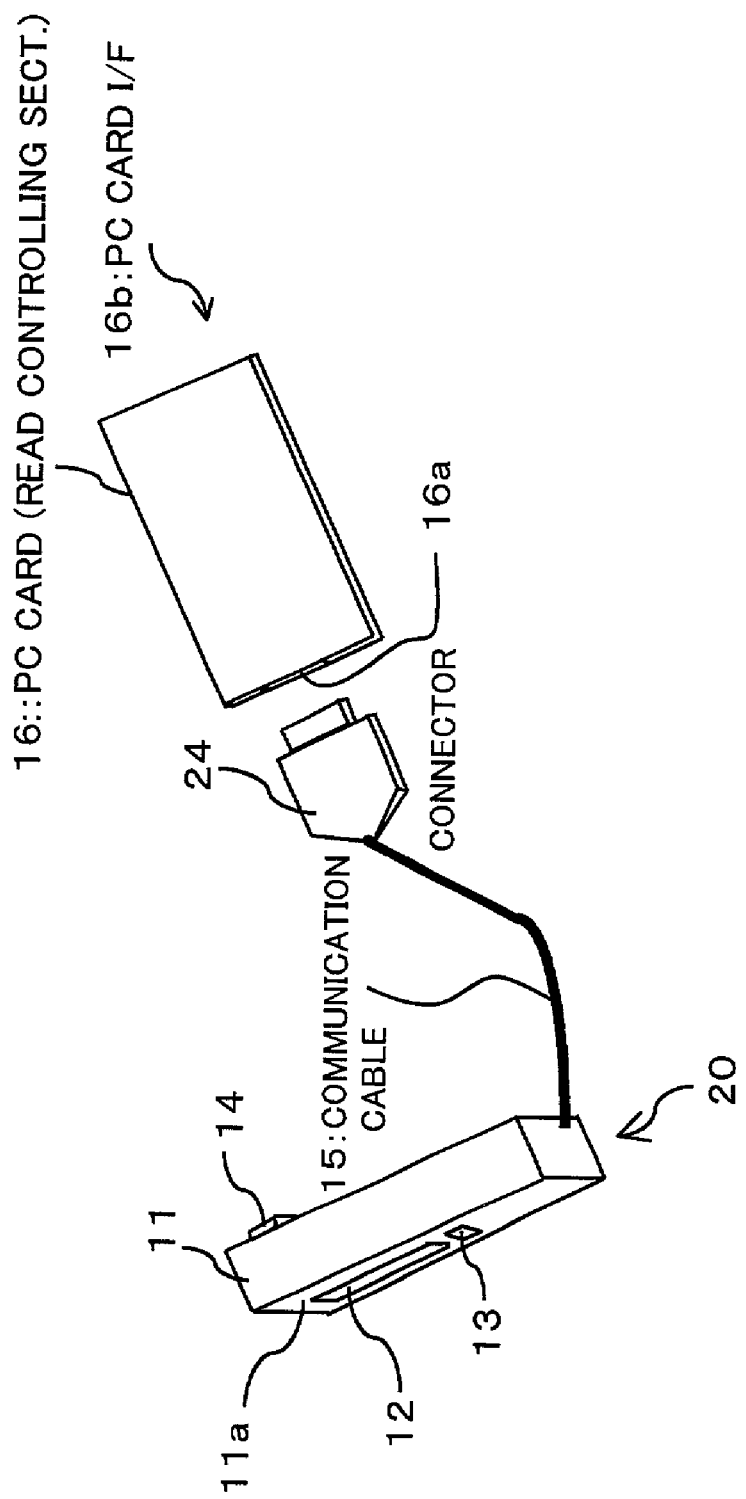
FIG. 2 is a diagram showing a perspective view of hardware of an image reading apparatus of the image reading system of FIG. 1.

(A) First Embodiment:

FIG. 1 schematically shows an image reading system according to a first embodiment; FIG. 2 shows a perspective view of hardware of an image reading apparatus of the image reading system of FIG. 1.

The image reading apparatus 1 according to the first embodiment is detachably connected to an information processing apparatus 40 (see FIG. 1), such as a notebook computer, and reads an image borne on a support (e.g., writing paper; not shown in drawings). The image reading apparatus 1 comprises a scanner unit 20, a communication cable 15, a connector 24 and a PC card 16, as shown in FIG. 2.

The scanner unit 20 includes an image reading section 21 and an amount-of-movement detecting section 22, which are disposed in a case 11, as shown in FIG. 1.

The case 11 is, for example, a substantial rectangular parallelepiped or a substantial cylinder. One of the planes of the case 11 is an image reading plane 11a, which comes into contact with a non-illustrated support on which an image to be read is borne as reading the image on the support. The image reading plane 11a is covered with a substantial rectangular transparent cover 12, which protects optical component parts constituting a later-described image reading section 21.

A roller 13 is installed on the image reading plane 11a in such a manner that the axis of rotation of the roller 13 is parallel to the longitudinal direction of the case 11. The roller 13 rotates in accordance with movement of the scanner unit 20 so as to detect an amount of movement of the scanner unit 20, and a part of the roller 13 protrude from the image reading plane 11a of the case 11. When the scanner unit 20 is moved on the support with the image reading plane 11a contacting with the support, the roller 13 rotates in accordance with the movement of the scanner unit 20.

The roller 13 is equipped with a non-illustrated rotary encoder that detects an amount of movement of the roller 13. The rotary encoder outputs a pulse signal S1 (see FIG. 1) per rotation of a predetermined amount of rotation of the roller 13.

Namely, the roller 13 rotates in accordance with an amount of movement on the support of the scanner unit 20 so that the rotary encoder detects an amount of relative movement of the scanner unit 20 with respect to the support. The combination of the roller 13 and the rotary encoder realizes a later-described amount-of-movement detecting section 22.

The case 11 is equipped with an operation switch 14 on the opposite plane of the image reading plane 11a. The press of the operation switch 14 by an operator activates the image reading apparatus 1 so that the image reading apparatus 1 is ready to read an image on a support.

The PC card 16 is an interface that is inserted to a non-illustrated card slot of the information processing apparatus 40 (see FIG. 1). A connector section 16a of the PC card 16 is inserted to connector 24 that is connected to the scanner unit 20 (the case 11) via the communication cable 15 into.

The PC card 16 is further equipped with a PC card interface (hereinafter also called an I/F section) 16b that is to be connected to the information processing apparatus 40 in the other end side of the connector section 16a.

A functional configuration of the image reading system 100 will now be described with reference to FIG. 1. The image reading system 100 includes the image reading apparatus 1 and the information processing apparatus 40, as shown in FIG. 1.

The image reading apparatus 1 comprises the scanner unit 20 and the data processing unit 10. The PC card 16 serves to function as the data processing unit 10.

The scanner unit 20 is equipped with the image reading section 21 and the amount-of-movement detecting section 22. The image reading section 21 optically reads an image on a support, and is equipped with a light source (e.g., light emitting diodes or a cold cathode fluorescent lamp) that illuminates an image on a support, a CCD (charge coupled device) that receives light reflected on the support and converts the received light to image data D1 (see FIG. 4C), and a lens installed relatively near to the light source and the CCD.

Receipt of a driving signal S2 (see FIG. 4B), which is output at a constant driving cycle T by a later described read controlling section 31, causes the image reading section 21 to read an image by each line of the image whereupon the image reading section 21 outputs the read image in image data D1. The first through ninth driving cycles are respectively denoted as T1 through T9 to specify individual driving cycle.

The image data D1 (see FIG. 4C) is composed of a line of the read image. Throughout this specification, when it is required that individual image data pieces is specified, the individual image data pieces are respectively denoted as image data D1-1, D1-2, D1-3 . . . D1-9 in accordance with correspondences with the driving signals T1, T2, T3 ... T9. Otherwise, unspecified image data piece is denoted as image data D1.

For convenience, input lines A-1 through A-9 are allocated to the image data D1-1 through D1-9 to discriminate individual image data from other image data. The numbers A-1 through A-9 of the input lines are serial numbers of the image data D1 that are input by the image reading section 21 at the intervals of the constant driving cycle T but not the numbers of the lines of the image on the support.

The amount-of-movement detecting section 22 outputs a pulse signal S1 (see FIG. 4A) for detecting an amount of movement each time the roller 13 rotates a predetermined amount. Namely, the amount-of-movement detecting section 22 outputs a pulse signal S1 for detecting an amount of movement each time when the image reading section 21 (the image reading apparatus 1) moves a predetermined distance on the support in the direction of scanning. A pulse signal S1 for detecting an amount of movement is output when it is detected that the image reading apparatus 1 moves the predetermined distance in the direction of scanning.

Throughout this specification, when it is required that an individual pulse signal S1 for detecting an amount of movement is specified, each pulse signals S1 are respectively denoted as pulse signals S1-1, S1-2, S1-3 ... S1-6. Otherwise, an unspecified pulse signal for detecting an amount of movement is denoted as a pulse signal S1.

The data processing section 10 comprises an image signal processing section 32, the read controlling section 31, and an I/F (interface) section 33. The image signal processing section 32 performs binarization (digitalization) on the image data D1 of analog data, which is received from the image reading section 21, in accordance with a result of comparing the image data D1 with a preset threshold value.

Further, the image signal processing section 32 outputs binary data D2 that is generated by digitalization with respect to the image data D1.

The binary image data D2 (see FIG. 4D) is generated by binarization of the image data D1 performed by the image signal processing section 32. Throughout this specification, when it is required that an individual binary image data piece is specified, each binary image data pieces are respectively denoted as binary image data D2-1, D2-2, D2-3 ... D2-9 in accordance with the correspondences with the driving signals T1, T2, T3 ... T9. Otherwise, an unspecified binary image data piece is denoted as binary image data D2.

The input lines A-1 through A-9 are respectively allocated to the binary image data D2-1, D2-2 ... D2-9 illustrated in FIG. 4D.

The read controlling section 31 outputs driver signals S2 (FIG. 4B) for driving and controlling the image reading section 21. The driver signals S2 are one-pulse signals successively output to the image reading section 21 from the read controlling section 31 accompanying with the driving cycles (T1, T2 ... T9). Throughout this specification, when it is required that an individual driver signal is specified, each driver signals are respectively denoted as driver signals S2-1, S2-2, S2-3 ... S2-9 in accordance with the correspondences with the driving signals T1, T2, T3 ... T9. Otherwise, an unspecified driver signal is denoted as driver signal S2.

The read controlling section 31 transfers amount-of-movement data M to the information processing apparatus 40 along with the binary image data D2. Further, the read controlling section 31 controls reading of the binary image data D2 received from the image signal processing section 32.

The read controlling section 31 includes a transfer-data generating section 101, a data compressing section 102, a state-of-transfer detecting section 103, a switch section 104, and a non-illustrated line buffer for temporarily storing the binary image data D2 received from the image signal processing section 32.

The transfer-data generating section 101 generates image data based on unit line data (data composed of a line of the read image, in the illustrated embodiment), upon detection of movement of the image reading section 21 by the amount-of-movement detecting section 22.

More specifically, upon receipt of a pulse signal S1 for detecting an amount of movement of the image reading section 21 from the amount-of-movement detecting section 22 (the rotary encoder) of the scanner unit 20, the transfer-data generating section 101 obtains the binary image data D2 (see FIG. 4D), which has been digitalized by the image signal processing section 32, each time as receipt of an individual pulse signal S1, whereupon generating transfer data D3 (see FIG. 4E) composed of the obtained binary image data D2 and the amount M of movement.

The transfer data D3 is composed of the binary image data D2 and the amount M of movement of the image reading section 21, which is detected by the amount-of-movement detecting section 22 and which is received by the transfer-data generating section 101. The amount M of movement represents the number of pulse signals S1 that is detected during a single driving cycle T (see FIG. 4B).

Throughout this specification, when it is required that an individual transfer data piece is specified, the each transfer data piece are respectively denoted as transfer data D3-1, D3-2, D3-3. D3-4 ... Otherwise, an unspecified transfer data piece is denoted as transfer data D3. An interruption for generating transfer data causes the transfer-data generating section 101 to generate the transfer data D3.

The input lines A-1, A-2, A-4, and A-7 are respectively allocated to the transfer data D3-1, D3-2, D3-3, and D3-4 illustrated in FIG. 4F.

The transfer data D3, which has been generated by the transfer-data generating section 101, is temporarily stored in a non-illustrated storage. The storage may be a dedicated buffer memory or may be a part of the above-mentioned line buffer. As an alternative, various changes or modifications of the storage are suggested.

The data compressing section 102 intermittently thins out the transfer data D3 other 5 than the particular transfer data D3, each of successive transfer data D3 pieces at a time, which successive transfer data D3 is generated by the transfer-data generating section 101 and is stored in the storage. Whereupon the data compressing section 102 adds the amount M of movement, which is contained in the thinned-out transfer-data D3, to the amount of movement M of movement, which is contained in the particular transfer data D3, and finally generates compressed data D4 (see FIG. 4G) composed of the image data of the particular transfer-data D3 and the added amount M of movement.

Throughout this specification, when it is required that an individual compressed data piece is specified, the each compressed data pieces are respectively denoted as D4-1, D4-2, D4-3 ... D4-4 ... Otherwise, an unspecified transfer data piece is denoted as compress data D4. The input lines A-1, and A-4 are respectively allocated to the transfer data D4-1, and D4-2 illustrated in FIG. 4G.

The state-of-transfer detecting section 103 detects a state of the transferring (a speed of the transferring) of the later-described I/F section 33. More specifically, the state-of-transfer detecting section 103 detects a speed of transferring as a transfer state by detecting a speed of inputting and a speed of outputting per a predetermined unit time period thereby detects a speed of transfer of the I/F section 33.

The switch section 104 switches a mode of the transferring by the I/F section 33 in accordance with a result of the detection by the state-of-transfer detecting section 103 by selecting one from modes consisting of a normal transfer mode in which the transfer data D3, which has been generated by the transfer-data generating section 101, is transferred to the information processing apparatus 40 by the I/F section 33, and a compression transferring mode, in which the compressed data D4, which has been generated by the data compressing section 102, is transferred to the information processing apparatus 40 by the I/F section 33.

Namely, if it is determined that a speed of inputting or outputting of the line buffer is smaller than a predetermined threshold value based on the result of the detection by the state-of-transfer detecting section 103, the switch section 104 determines that the transferring is carried out at a low speed and transfers the compressed data D4, which has been generated by the data compressing section 102, to the information processing apparatus 40 by the I/F section 33 (the compression transferring mode).

On the other hand, if it is determined that a speed of inputting or outputting of the line buffer is equal to or larger than the predetermined threshold value based on the result of the detection by the state-of-transfer detecting section 103, the switch section 104 determines that the transferring is carried out at a high speed and transfers the transfer data D3, which has been generated by the transfer-data generating section 101, to the information processing apparatus 40 by the I/F section 33 (the normal transferring mode).

When at least one pulse signal S1 for detecting an amount of movement is input to the read controlling section 31 during the individual driving cycle (T1, T2 . . . (see FIG. 4B) in the normal transfer mode, the read controlling section 31 transfers the binary image data D2 to the information processing apparatus 40 by controlling the I/F section 33. If two or more pulse signals S1 are input to the read controlling section 31 during a single cycle, the read controlling section 31 controls to transfer the binary image data D2 one time.

In the compression transferring mode, the data compressing section 102 in the read controlling section 31 thins out the transfer data piece (data piece represented by the input lines "A-2", "A-7" in FIG. 4F) other than particular transfer data piece (data piece represented by the input lines "A-1", "A-4" in FIG. 4F), each of successive data pieces (two pieces in the example of FIG. 4F) generated by the transfer-data generating section 101, and the individual amounts of M (the respective amounts of M are 3, and 1 in FIG. 4F) of movement, which are contained in the thin-out transfer data pieces ("A-2", "A-7"), are respectively added to the individual amounts of M (the respective amounts of M are 1, and 1 in FIG. 4F) of movement, which contained in the particular transfer data pieces ("A-1", "A-4" in FIG. 4F) by the data compressing section 102. Thereby, data compressing section 102 in the read controlling section 31 generates compressed data D4 composed of the image data of the particular transfer data pieces ("A-1", "A-4" in FIG. 4G) and the added amounts of M (the respective added amounts of M are 4 and 2, respectively) of movement. The read controlling section 31 transfers the compressed data D4 to the information processing apparatus 40 via the I/F section 33 by controlling the I/F section 33. Further detailed description will be made with respect to the operation performed by the read controlling section 31.

The I/F section (the data transferring section) 33 transfers one of the transfer data D3 generated by the transfer-data generating section 101 and the compressed data D4 generated by the data compressing section 102 to the information processing apparatus 40. The I/F section 33 consists of the communication cable 15, the connector 24 and the PC card 16, as shown in FIG. 2, and interfaces the read controlling section 31 with the information processing apparatus 40.

The information processing apparatus 40 is, for example, a notebook computer and performs various processing for displaying the image on a non-illustrated monitor based on image data (binary image data) received from the read controlling section 31 and for other operations. The information processing apparatus 40 is the destination of transferring the transfer data D3 and the compressed data D4 from the image reading apparatus 1; the information processing apparatus 40 restores the image that has been read by the image reading apparatus 1 by reproducing the image data in the transfer data D3 or the compressed data D4 in accordance with the added amount M of movement of the transfer data D3 or the compressed data D4.

When the image is restored, the information processing apparatus 40 obtains the amount M of movement in the received transfer data D3 or the received compressed data D4, and makes M-1 copies of the image data in the received transfer data D3 or the received compressed data D4 in such a manner that the number of pieces of the image data becomes identical with the amount M of movement.

The procedural steps (A10 to A90 in flow diagram FIG. 3) performed by the image reading apparatus 1 will now be described with reference to FIGS. 2, 4A through 4G, 5A through 5C and 6A through 6D. FIGS. 4A through 4G show a time chart of process performed by the data processing unit 10; FIGS. 5A through 5C show data generated in the normal transferring mode in the image reading system 100 of the illustrated embodiment; and FIGS. 6A through 6D show data generated in the compression transferring mode in the image reading system 100 of the illustrated embodiment.

When an operator intends to read an image on a writing paper sheet, the operator puts the scanner unit 20 on starting position of the sheet in such a manner that the image reading plane 11a (see FIG. 2) come into contact with the sheet. At that time, the roller 13 (see FIG. 2) abuts on the sheet.

A press of the operation switch 14 by the operator causes the read controlling section 31 to output the driving signal S2-1 to the image reading section 21 at time t0 (see FIG. 4B). After that, the read controlling section 31 monitors whether or not the pulse signal S1 for detecting an amount of movement is input thereto during the driving cycle T1, which starts at the time when the driving signal S2-1 is output (i.e., at time t0).

The image reading section 21 is activated by receipt of driving signal S2-1 therein so as to read a single line of the image, whereupon outputs the image data D1-1 (the input line A1-1) to the image signal processing section 32.

The image data D1-1 corresponding to the input line A1-1 is binarized by the image signal processing section 32 as shown in FIG. 4D and inputted to the read controlling section 31, as binary image data D2-1 (see FIGS. 5A, 6A). The read controlling section 31 stores the received binary image data D2-1 in the line buffer until receiving binary image data D2-2 that is binarized (digitalized) data of the successive image data D1-2.

The read controlling section 31 sets the number L of lines that are to be read (hereinafter also called the "to-be-read lines", in the illustrated example, L=4) (Step A10), and initialize (X=0) the number X of lines that is already read (hereinafter also called the "already-read lines") After setting the number L of to-be-read lines, the read controlling section 31 determines whether or not the number L of to-be-read lines is equal to the number X of already-read lines (Step A20).

When the number L of to-be-read lines is not equal to the number X of already-read lines (No route in Step A20), the read controlling section 31 determines whether or not the read controlling section 31 receives one or more pulse signals S1 (encoder pulses) of detecting an amount of movement (Step A30). For example, when the read controlling section 31 receives no pulse signal S1 (No route in Step A30) likewise at the time t0, the procedural steps returns back to Step A20 and the data processing unit 10 repeats the above-mentioned steps.

The operator grasps the case 11 and slides the case 11 in contact with the sheet in the direction of scanning lines thereby the image reading apparatus 1 starts reading the image on the sheet. The frictional force between the case 11 and the sheet rotates the roller 13 thereby an amount of movement of the image reading section 21 (the image reading apparatus 1) is detected.

If the read controlling section 31 receives one or more pulse signals (encoder pulses) S1 for detecting an amount of movement (Yes route in Step A30), such as the pulse signal S1 inputted at time t1, the state-of-transfer detecting section 103 in the read controlling section 31 detects a speed of transferring of the I/F section 33. At that time, the read controlling section 31 performs an interruption process for generating the transfer data D3 (Step A40) in addition to the detecting of the speed of the transferring.

The state-of-transfer detecting section 103 of the read controlling section 31 detects a state of inputting/outputting of the line buffer. The read controlling section 31 reads the binary image data D2 (FIG. 4D) from the line buffer and obtains an amount M of movement of the driving cycle T1, shown in FIGS. 5B and 6B, to generate the transfer data D3.

For example, at time t7 in FIG. 4E, the read controlling section 31 performs the interruption process in which the read controlling section 31 reads binary image data D2-1 (see FIG. 4D) from the non-illustrated line buffer and obtains the read binary image data D2-1 and the amount M (M=1) of movement during the driving cycle T1 to generate transfer data D3-1 (see FIGS. 5A and 6A). The transfer data D3-1 is stored in the non-illustrated storage, such as a buffer memory.

During the driving cycle T2 which starts at receipt of the successive driving signal S2-2 by the image reading section 21, the image signal processing section 32 converts the image data D1-2 to binary image data D2-2, which is to be stored in the line buffer in the read controlling section 31.

The read controlling section 31 obtains the binary image data D2-2 from the line buffer and obtains the amount M (M=3) of movement in accordance with an interruption signal issued at time t8 to generate transfer data D3-2 and stored the transfer data D3-2 in the storage.

During the driving cycle T2, the read controlling section 31 successively receives three pulse signals S1-2, S1-2 and S1-3 for detecting an amount of movement at times t2, t3, and t4, respectively (FIG. 4A). In this case, the amount M of movement in the driving cycle T2 is "3".

When the read controlling section 31 receives a pulse signal S1-5 for detecting an amount of movement at time t5 during the time cycle T4, the read controlling section 31 performs an interruption process so as to generate transfer data D3 at time t9.

The read controlling section 31 reads binary image data D2-4 from the line buffer at time t9, whereupon converts the binary image data D2-4 to transfer data D3-3 to store it in the storage.

Similarly, when the read controlling section 31 receives a pulse signal S1-6 for detecting an amount of movement at time t6 during driving cycle T7 while binary image data D2-7 is stored in the line buffer, the read controlling section 31 reads binary image data D2-7 from the line buffer at time t10 and converts the binary image data D2-7 to transfer data D3-4 to store it in the storage Since the read controlling section 31 receives no pulse signal for detecting an amount of movement during driving cycles T5 and T6, the individual amounts of M of movement corresponding to binary image data D2-5 and D2-6 are both "0". At that time, the read controlling section 31 generates no transfer data respectively corresponding to the binary image data D2-5 and D2-6.

After that, the read controlling section 31 increments the number X of already-read lines by one (Step A50) whereupon the state-of-transfer detecting section 103 detects the speed of transferring of the line buffer (Step A60). When a speed of inputting/outputting of the line buffer is larger than the predetermined threshold value S (Yes route in Step A60), that is the speed of transferring is large, the switch section 104 switches the mode of the transferring by selecting the normal transferring mode. The read controlling section 31 causes the I/F section 33 to transfer the transfer data D3 stored in the storage to the information processing apparatus 40 (Step A70). Then, the data processing unit 10 returns back to Step A20.

Upon receipt of the transfer data D3, the information processing apparatus 40 refers the amount M of movement in the transfer data D3 and restores the image by reproducing M-1 pieces of the image data in the transfer data D3 in such a manner that the total number of pieces of the image data becomes the number of the amount M of movement as shown in FIG. 5C.

For example, since the amount M of movement in the transfer data D3-1 (corresponding to the input line A-1) generated during the driving signal T1 in FIG. 4B is "1", the information processing apparatus 40 makes no copy of the image data in the transfer data D3-1, and generates a restored image data piece B1-1 using the image data.

Otherwise, since the amount M of movement in the transfer data D3-2 (corresponding to the input line A-2) generated during the driving signal T2 in FIG. 4B is "3", the information processing apparatus 40 makes two copies of the image data in the transfer data D3-2 in such a manner that the total number of image data becomes three, and generates three restored image data pieces B-2, B-3, and B-4.

The information processing apparatus 40 displays the restored image data pieces B-1, B-2, B-3, and B-4 (respectively corresponding to the effective input lines A-1, A-2, A-4, and A-7) on the monitor.

When a speed of inputting/outputting of the line buffer is equal to or smaller than the predetermined threshold value S (No route in Step A60), the switch section 104 switches the mode of the transferring by selecting the compression transfer mode. The read controlling section 31, as shown in FIG. 6C, thins out transfer data D3 other than particular transfer data D3, each of (two in the illustrated embodiment) successive transfer data pieces at a time, and adds the amount M of movement, which is contained in the thinned-out transfer data D3, to the amount M of movement, which is contained in the particular transfer data D3, thereby generating compressed data D4 composed of the image data in the particular transfer data D3 and the added amount M of movement (Step A80).

With respect to two transfer data D3-1 and D3-2 respectively corresponding to the effective input lines A-1 and A-2, the read controlling section 31 thins out the transfer data D3-2 (the effective input line A-2), and adds the amount M (M=3) of movement contained in the thinned-out transfer data D3-2 to the amount M (M=1) of movement contained in the transfer data D3-1 thereby generating compressed data piece D4-1 composed of the image data (the input line A-1) in the transfer data D3-1 and the added amount M (M=4) of movement, as shown in FIG. 6C.

Similarly, with respect to two transfer data D3-3 and D3-4 respectively corresponding to the effective input lines A-4 and A-7, the read controlling section 31 thins out the transfer data D3-4 (the effective input line A-7), and adds the amount M (M=1) of movement contained in the thinned-out transfer data D3-4 to the amount M (M=1) of movement contained in the transfer data D3-3 thereby generating compressed data D4-2 composed of the image data (the input line A-4) in the transfer data D3-3 and the added amount M (M=2) of movement.

After that, the read controlling section 31 transfers the generated compressed data D4 to the information processing apparatus 40 (Steps A90), and Step A20 is proceeded to.

Upon receipt of the compressed data D4, the information processing apparatus 40 refers the amount M of movement in the received compressed data D4 and restores the image by reproducing the image data in the compressed data D4 in such a manner that the total number of pieces of the image data in the received compressed data D4 is the number of the amount M of the movement, as shown in FIG. 6D.

For example, since the compressed data D4-1 (the input line A-1) has the amount M (M=4) of movement, the information processing apparatus 40 generates restored image data pieces B-1 through B-4 by making three M-1 copies of the image data in the compressed data D4-1 such that the total number of image data pieces becomes four, as shown in FIG. 6D.

In the same manner, since the compressed data D4-2 (the input line A-4) has the amount M (M=2) of movement, the information processing apparatus 40 generates restored image data pieces B-5 and B-6 by making one M-1 copy of the image data in the compressed data D4-2 such that the total number of image data pieces becomes two, as shown in FIG. 6D.

After that, the information processing apparatus 40 displays the restored image data (the effective input lines A-1 and A-7) on the monitor therein.

Figure 7:
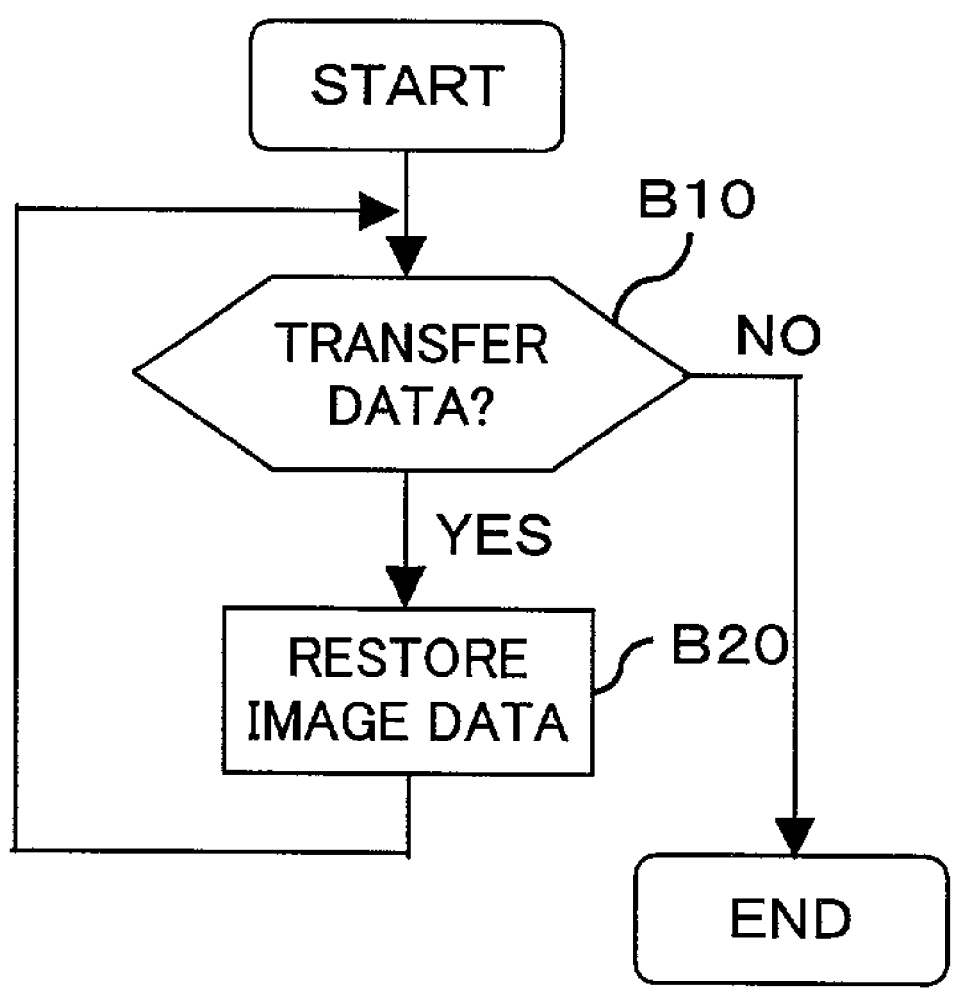
FIG. 7 is a flow diagram illustrating a succession of procedural steps of processing image data performed by a information processing apparatus of the image reading system of FIG. 1

The procedural steps (Steps B10 and B20) performed in the information processing apparatus 40 in the image reading system 100 will now be described with reference to flow diagram FIG. 7. First of all, the information processing apparatus 40 determines whether or not the information processing apparatus 40 receives transfer data D3 or compressed data D4 from the data processing unit 10 (the I/F section 33) (Step B10). If the information processing apparatus 40 receives data from the data processing unit 10(Yes route in Step B10), the information processing apparatus 40 restores the image data based on the received transfer data D3 or compressed data D4 in the above-mentioned manner described with reference to FIGS. 5C and 6D (Step B20), whereupon Step B10 is proceeded to. When the transferring of data to the information processing apparatus 40 terminates (No route in Step B10), the information processing apparatus 40 stops the process.

In the image reading system 100 of the illustrated embodiment, transfer data D3 or compressed data D4, which contains image data and an amount M of movement, is transferred to the information processing apparatus 40, and the information processing apparatus 40 generates the restored image data based on the image data and the amount M of movement contained in the received transfer data D3 or the received compressed data D4. Therefore, even if the movement of the scanner unit 20 (the scanning) by an operator is too fast so that a cycle of the pulse signal S1 is shorter than the driving cycle T of the driving signal S2 of the data processing unit 10, one or more copies of the image data are made in accordance with the amount M of movement thereby preventing a part of the restored image from missing. As a result, the information processing apparatus 40 displays the image without decreasing in size in the direction of the scanning lines thereby providing a high-quality image.

Further, since the data compressing section 102 thins out transfer data D3 other than particular transfer data D3, each of successive transfer data pieces that have been generated by the transfer-data generating section 101, and adds the amount M of movement in the thinned-out transfer data D3 to the amount M of movement in the particular transfer data D3 thereby generating compressed data D4 composed of the image data in the particular data D3 and the added amount M of movement, it is possible to reduce an amount of data to be transferred to the information processing apparatus 40.

As an advantageous result, the capability of a machine for data transfers (the I/F section 33) eliminates high performance, it is possible to manufacture the image reading apparatus 1 with a reduced cost.

Even if image data composed of one line of an image obtained by a line sensor of the scanner unit 20 increase in capacity because of reading the image with high resolution, it is possible to reduce an amount of data to be transferred to the information processing apparatus 40 from the image reading apparatus 1. The data transferring to the information processing apparatus 40 can be surely executed.

Figure 8:
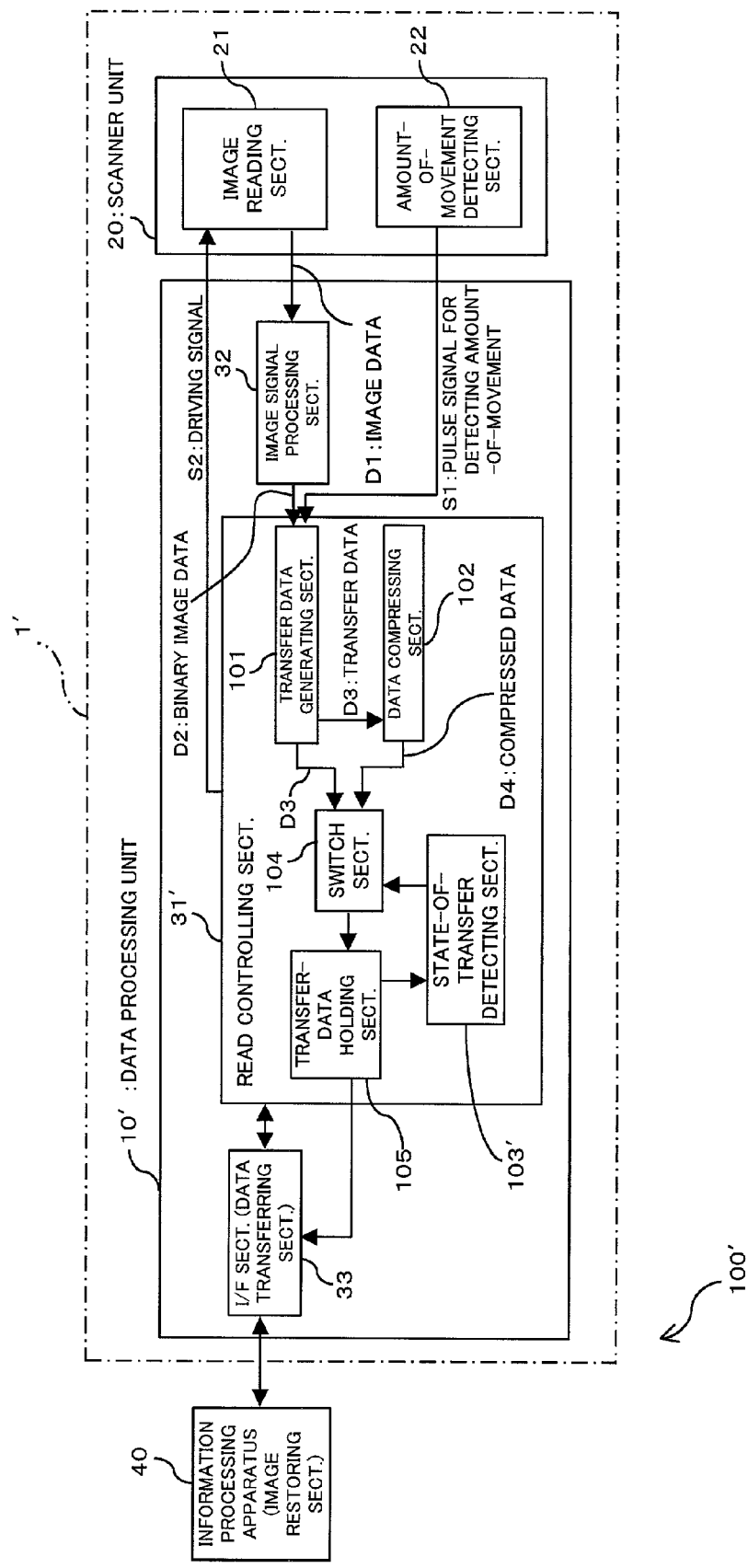
FIG. 8 is a block diagram similar to FIG. 1, but schematically showing an image reading system according to a second embodiment.

(B) Second Embodiment:

FIG. 8 is a block diagram similar to FIG. 1, but schematically showing an image reading system 100' according to a second embodiment. The image reading apparatus 1' of the second embodiment constitute the image reading system 10'. The image reading apparatus 1' is detachably connected to an information processing apparatus 40 (FIG. 1), such as a notebook computer, and reads an image borne on a support (e.g., writing paper; however not shown in drawings), likewise the image reading apparatus 1 of FIG. 1.

As shown in FIG. 8, the image reading apparatus 1' includes a data processing section 10' as a substitution for the data processing section 10 of the first embodiment. The data processing unit 10' is identical in hardware with the data processing unit 10. Reference numbers identical between FIGS. 1 and 8 designate identical or substantially identical parts or elements, so repetitious description is omitted here.

The data processing unit 10' is equipped with a read controlling section 31' as a substitution of the read controlling section 31 of the first embodiment.

The read controlling section 31' includes a state-of-transfer detecting section 103' as a substitution for the state-of-transfer detecting section 103, and further includes a holding section 105. The holding section 105 is disposed upstream of the I/F section 33, and temporarily stores the transfer data D3 or the compressed data D4 before transferring the transfer data D3 or the compressed data D4 to the information processing apparatus 40 by the I/F section 33. The holding section 105 is a large-capacity RAM (random access memory), and performs read/write operations slower than those performed by the line buffer.

The transfer data D3 generated by the transfer-data generating section 101 and the compressed data D4 generated by the data compressing section 102 are temporarily stored in the holding section 105 before being transferred to the information processing apparatus 40 by the I/F section 33.

The I/F section 33 sequentially transfers the transfer data D3 and the compressed data D4 to the information processing apparatus 40 in order of being stored. The state-of-transfer detecting section 103' monitors an unoccupied capacity of the holding section 105 thereby detects a state (a speed) of transferring of the I/F section 33.

If the switch section 104 detects that the unoccupied capacity of the holding section 105 is equal to or smaller than a predetermined threshold value (e.g., 10%), it is determined that the speed of the transferring by the I/F section 33 is small and the switch section 104 causes the I/F section 33 to transfer the compressed data D4 generated by the data compressing section 102 to the information processing apparatus 40 (in the compression transfer mode).

On the other hand, if the switch section 104 detects that the unoccupied capacity of the holding section 105 is larger than a predetermined threshold value (e.g., 10%), it is determined that the speed of the transferring by the I/F section 33 is large and the switch section 104 causes the I/F section 33 to transfer the transfer data D3 generated by the transfer-data generating section 101 to the information processing apparatus 40 (in the normal transfer mode).

The I/F section (the data transferring section) 33 transfers one of the transfer data D3 and the compressed data D4 temporarily stored in the holding section 105 to the information processing apparatus 40.

Figure 9:
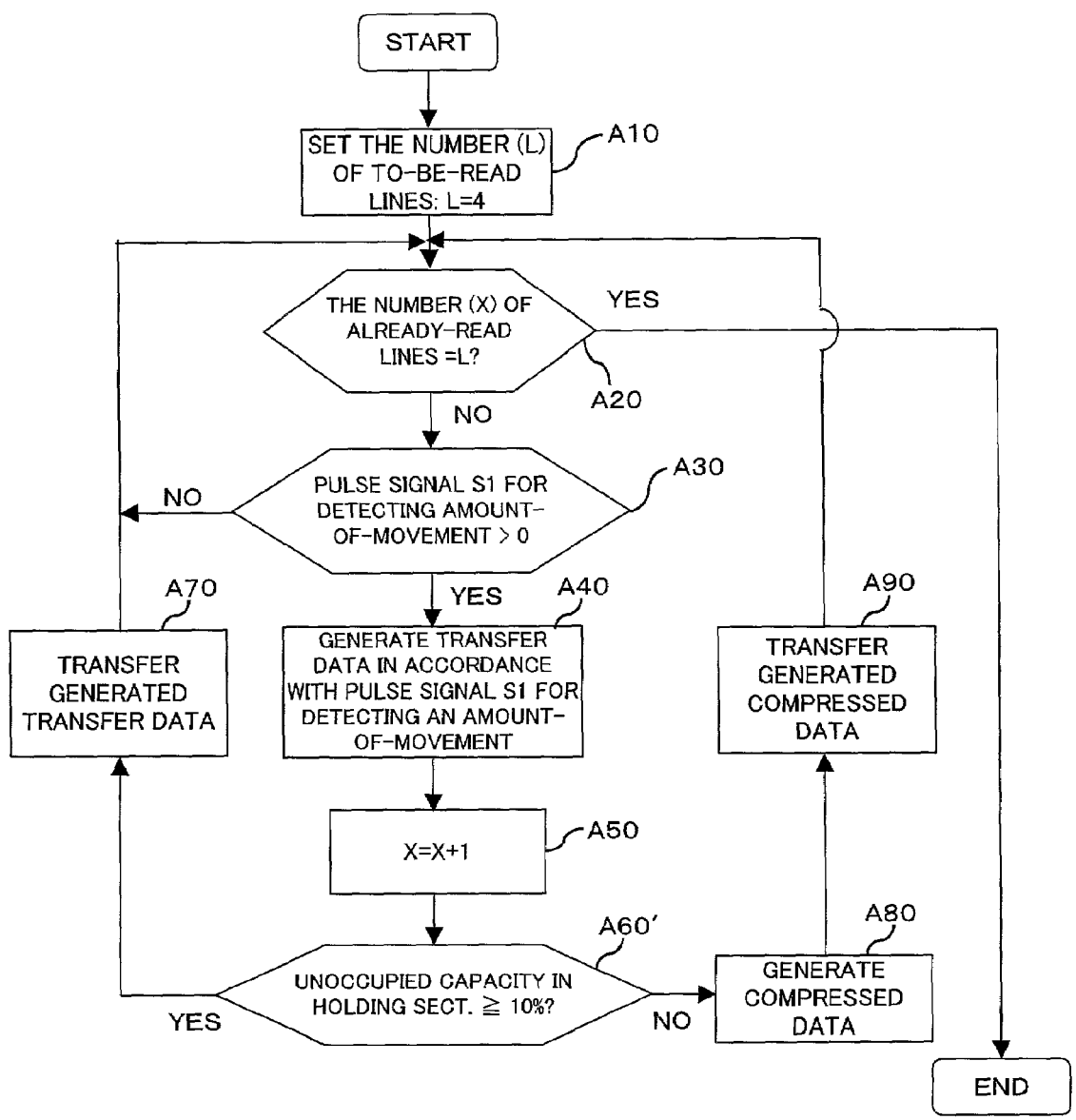
FIG. 9 is a flow diagram similar to FIG. 3, but illustrating a succession of procedural steps of reading an image on a support by the image reading system of FIG. 8.

FIG. 9 illustrates a succession of procedural steps (Steps A10 to A50,A60',A70 to A90) of reading an image on a support by the image reading apparatus 1' of the illustrated embodiment.

Figure 3:
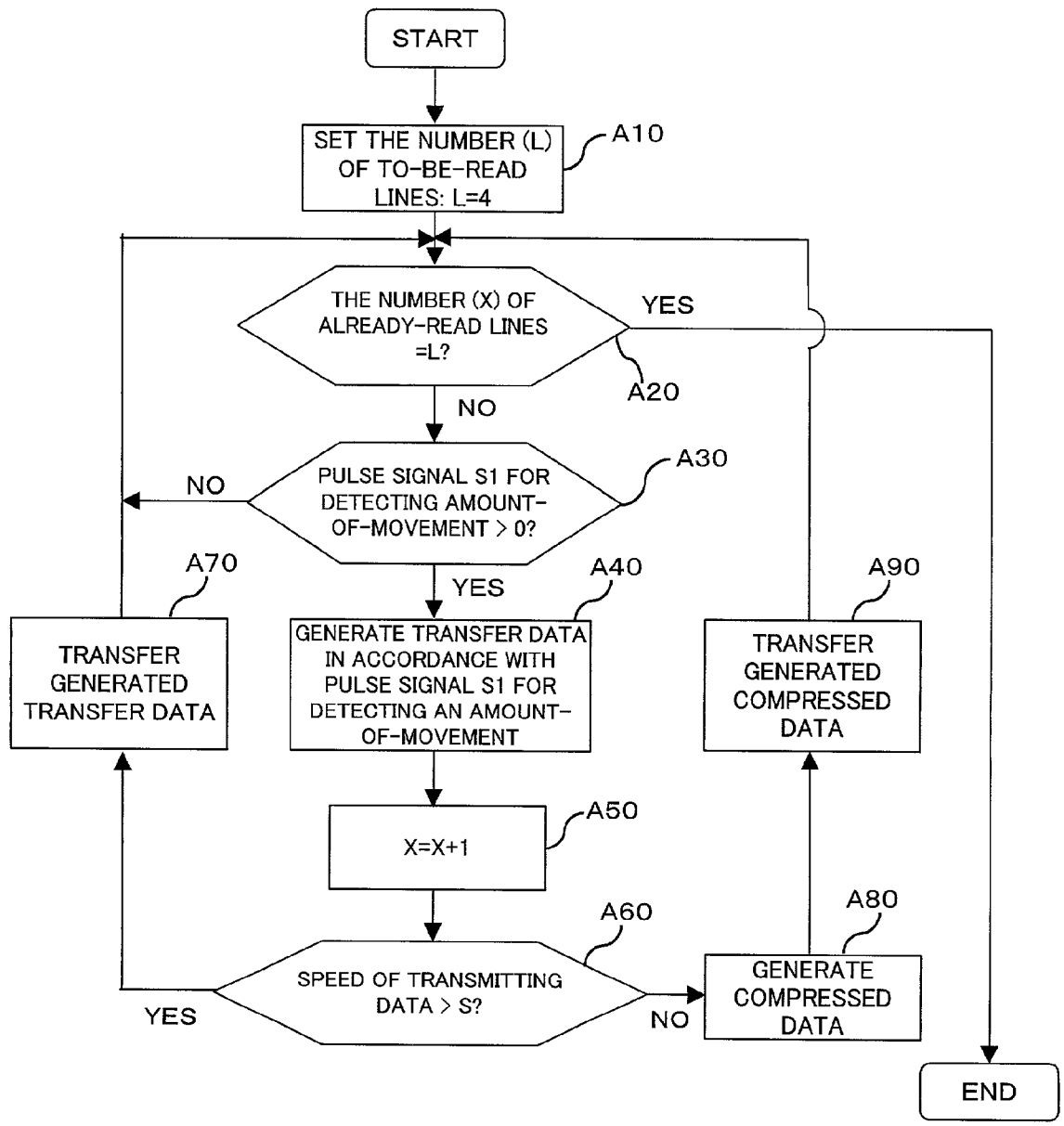
FIG. 3 is a flow diagram illustrating a succession of procedural steps of reading an image on a support performed by the image reading apparatus of FIG. 2.

The flow diagram of FIG. 9 has Step A60' as a substitution of Step A60 of the first embodiment in the FIG. 3. Other steps A10 to A50, and A70 to A90 are respectively identical with Steps A10 to A50, and A70 to A90 in FIG. 3, so any repetitious description is omitted here.

At step A60', the state-of-transfer detecting section 103' detects an unoccupied capacity of the holding section 105. If the detected unoccupied capacity is larger than the predetermined threshold value (e.g., 10%) (Yes route in Step A60'), it is determined that the speed of the transferring is large and the switch section 104 switches the mode of the transferring by selecting the normal transfer mode so that the I/F section 33 transfers the transfer data D3 to the information processing apparatus 40 (Step A70).

On the contrary, if the detected unoccupied capacity is equal to or smaller than the predetermined threshold value (e.g., 10%) (No route in Step A60'), it is determined that the speed of the transferring is small and the switch section 104 switches the mode of the transferring by selecting the compression transfer mode so that the data compressing section 102 generates the compressed data D4 (Step A80) and the I/F section 33 transfers the generated compressed data D4 to the information processing apparatus 40 (Step A90).

As mentioned above, the image reading system 100' guarantees the same advantageous results as the first embodiment. Additionally, since the transfer data D3 and the compressed transfer data D4 are temporarily stored in the holding section 105 before the transferring to the information processing apparatus 40, the data is surely transferred to the information processing apparatus 40 even if the speed of the transferring by the I/F section 33 is small. Even if image data composed of one line of an image obtained by a line sensor of the scanner unit 20 increase in capacity because of the reading the image with high resolution, it is possible to surely execute transferring of data to the information processing apparatus 40.

Further, it is possible to detect a state of the transferring of the I/F section 33 with ease because the state-of-transfer detecting section 103' detects an unoccupied capacity of the holding section 105. With such detection of an unoccupied capacity, even if the transfer of data to the information processing apparatus 40 get stuck, it is possible to surely transfer data to the information processing apparatus 40, preventing the data to be transferred to the information processing apparatus 40 from overflowing from the holding section 105.

Still further, since a small unoccupied capacity in the holding section 105 causes to the switch section 104 to select the compression transfer mode in which the compressed data D4, which has been generated by the data compressing section 102, the holding section 105 would not always need a large capacity. As a result, the data processing unit 10' can be equipped with the holding section 105 having a relatively small capacity thereby reducing the manufacturer cost.

(C) Others:

The image reading apparatuses 1 and 1' and the information processing apparatus (image restoring section) 40 of the first and second embodiments is realized by a computer, such as a CPU, that executes a program. The computer serves as the transfer-data generating section 101, the data compressing section 102, the state-of-transfer detecting section 103 (103'), the switch section 104, the image signal processing section 32, and the I/F section 33 by executing the program.

The recording of the program in a computer-readable medium facilitates retaining and distributing the program. The computer-readable medium is exemplified by a magnetic recording apparatus, a magneto-optical recording apparatus, a CD-ROM, a CD-R, a CD-RW, a DVD, a DVD-R, a DVD-RW, a floppy disk, or a memory card. A server on the Internet may retain the program so that apparatuses accessible to the Internet obtain the program.

Further, the present invention should by no means be limited to these foregoing embodiments, and various changes or modifications may be suggested without departing from the gist of the invention.

As an alternative, the data processing units 10 and 10' may be included in the information processing apparatus 40 and may be connected to the scanner unit 20 by a cable. Further, the data processing units 10 and 10' and the scanner unit 20 may be included in the information processing apparatus 40 thereby the image reading systems 100, 100' is in an all-in-one type.

In the both embodiment, an operators of the image reading apparatuses 1 and 1' scan the image on the still writing paper by moving the scanner unit 20; however the manner of scanning should by no means be limited to that as described. As an alternative, the image reading apparatuses 1 and 1' may be equipped with a conveyer for conveying a support (writing paper) in the image reading apparatuses 1 and 1' with respect to the still scanner unit 20.

Further, in the first and second embodiments, the driving signal S2 causes the image reading section 21 to read a line of an image on a support; however the manner of reading an image should by no mean be limited to reading line by line.

Alternatively, the image reading section 21 may successively read a plurality of lines of the image at a time.

The image reading apparatuses 1 and 1' comprise the scanner unit 20, the communication cable 15, the connector 24, and the PC card 16. The scanner unit 20 is communicably connected to the information processing apparatus 40 via the communication cable 15, the connector 24, and the PC card 16. However, the scanner unit 20 should by no means be limited to be connected in the abovementioned manner. As an alternative, the scanner unit 20 may be connected to the information processing apparatus 40 via USB (Universal serial bus), RS/232C, or SCSI.

In this case, each element in the data processing units 10 and 10' may be included in either the scanner 20 or the information processing apparatus 40.

In the first embodiment, the state-of-transfer detecting section 103 detects the speed of the transferring data by detecting the speed of inputting/outputting of the line buffer; in the second embodiment, the state-of-transfer detecting section 103' detects the speed of the transferring data by detecting an unoccupied capacity of the holding section 105. However, the detecting of a state of the transferring data should by no means be limited to those described in the specification.

In other words, the state-of-transfer detecting sections 103 and 103' detect the speed of inputting/outputting of the line buffer and an unoccupied capacity of the holding section 105, and may detect the speed of the transferring data based on the results of the previous detecting. As another alternative, the detecting of the speed of the transferring data may be performed based on detecting of the speed of inputting/outputting of the storage per a unit time, and various alternatives may be applied in order to detect the state of the transferring data.

Further, state-of-transfer detecting sections 103 and 103' detect the speed of the transferring data or an unoccupied capacity of the holding section 105 as a state of transfer. The stated of transfer should by no means be limited to be detected by the speed of the transferring data, and, alternatively, other parameters may be used to detect the state of transfer.

The shape of the case 11 should by no means limited to a rectangular parallelepiped or a cylinder. As an alternative, the case 11 may be various shapes other than a rectangular parallelepiped or a cylinder.

What is claimed is:

1. An image reading apparatus for reading an image borne on a support, comprising:

an image reading section for reading the image in unit line data, which is composed of a predetermined number of lines of the image, for every predetermined time interval as said image reading section is moved on the support;

an amount-of-movement detecting section for detecting an amount of relative movement of said image reading section with respect to the support;

a transfer-data generating section for generating image data based on said unit line data upon detection of movement of said image reading section by said amount-of-movement detecting section, obtaining an amount of movement corresponding to said image data based on said amount of relative movement, of said image reading section, detected by said amount-of-movement detecting section, and generating transfer data composed of said obtained image data and said amount of movement, said transfer data including successive transfer data pieces;

a data compressing section for intermittently thinning out at least one transfer data piece from said tansfer data pieces in said transfer data, adding said amount of movement, which is contained in said thinned-out transfer data piece, to said amount of movement, which is contained in one data piece of the remaining transfer data pieces, which have not been thinned out, and generating compressed data composed of said image data in said one data piece and said added amount of movement; and a data transferring section for transferring one of said transfer data, which has been generated by said transfer data generating section, and said compressed data, which has been generated by said data compressing section, to a destination.

2. An image reading apparatus according to claim 1, further comprising:

a state-of-transfer detecting section for detecting a state of the transferring of said data transferring section;

a switch section for switching a mode of the transferring by said data transferring section in accordance with a result of the detecting by said state-of-transfer detecting section by selecting one from modes consisting of (i) a normal transferring mode in which said transfer data, which has been generated by said transfer-data generating section, is transferred to the destination by said data transferring section, and (ii) a compression transferring mode in which said compressed data, which has been generated by said data compressing section, is transferred to the destination by said data transferring section.

3. An image reading apparatus according to claim 2, wherein:

if it is determined that the speed of the transferring by said data transferring section is equal to or smaller than a predetermined threshold value based on the result of the detecting by said state-of-transfer detecting section, said switch section selects said compression transferring mode; and said data transferring section transfers said compressed data, which has been received from said switch section, to the destination.

4. An image reading apparatus according to claim 1, further comprising a transfer-data holding section for temporarily holding said transfer data or said compressed data before the transferring of said transfer data or said compressed data by said data transferring section;

said state-of-transfer detecting section being operable to detect the state of transferring of said data transferring section based on an unoccupied capacity in said transfer-data holding section.

5. An image reading apparatus according to claim 2, further comprising a transfer-data holding section for temporarily holding said transfer data or said compressed data before the transferring of said transfer data or said compressed data to said data transferring section;

said state-of-transferring detecting section being operable to detect the state of transferring of said data transferring section based on an unoccupied capacity in said transfer-data holding section.

6. An image reading apparatus according to claim 3, further comprising a transfer-data holding section for temporarily holding said transfer data or said compressed data before the transferring of said transfer data or said compressed data to said data transferring section;

said state-of-transfer detecting section being operable to detect the state of transferring of said data transferring section based on an unoccupied capacity in said transfer-data holding section.

7. An image reading system for reading an image borne on a support, comprising:
- an image reading section for reading the image in unit line data, which is composed of a predetermined number of lines of the image, for every predetermined time interval as said image reading section is moved on the support;
- an amount-of-movement detecting section for detecting an amount of relative movement of said image reading section with respect to the support;
- a transfer-data generating section for generating image data based on said unit line data upon detection of movement of said image reading section, obtaining an amount of movement corresponding to said obtained image data based on said amount of relative movement, of said image reading section, detected by said amount-of-movement detecting section, and generating transfer data composed of said obtained image data and said amount of movement, said transfer data including successive transfer data pieces;
- a data compressing section for intermittently thinning out at least one transfer data piece from said transfer data pieces in said transfer data, adding said amount of movement, which is contained in said thinned-out transfer data piece, to said amount of movement, which is contained in one data piece of the remaining transfer data pieces, which have not been thinned out, and generating compressed data composed of said image data in said one data piece and said added amount of movement;
- a data transferring section for transferring one of said transfer data generated by said transfer data generating section and said compressed data generated by said data compressing section to a destination; and
- an image restoring section, disposed at the destination with respect to said data transferring section, for restoring the image by reproducing said image data, in said transfer data or said compressed data, in accordance with said amount of movement in said transfer data or said compressed data.

8. An image reading system according to claim 7, further comprising:
- a state-of-transfer detecting section for detecting a state of the transferring of said data transferring section;
- a switch section for switching a mode of the transferring by said data transferring section in accordance with a result of the detecting by said state-of-transfer detecting section by selecting one of modes consisting of (i) a normal transferring mode in which said transfer data, which has been generated by said transfer-data generating section, is transferred to the destination by said data transferring section, and (ii) a compression transferring mode in which said compressed data, which has been generated by said data compressing section, is transferred to the destination by said data transferring section.

9. An image reading system according to claim 8, wherein:
- if it is determined that the speed of the transferring by said data transferring section is equal to or smaller than a predetermined threshold value based on the result of the detecting by said state-of-transfer detecting section, said switch section selects said compression transferring mode; and
- said data transferring section transfers said compressed data to the destination.

10. An image reading system according to claim 7, further comprising a transfer-data holding section for temporarily holding said transfer data or said compressed data before the transferring of said transfer data or said compressed data by said data transferring section;
- said state-of-transfer detecting section being operable to detect the state of transferring of said data transferring section based on an unoccupied capacity in said transfer-data holding section.

11. An image reading system according to claim 8, further comprising a transfer-data holding section for temporarily holding said transfer data or said compressed data before the transferring of said transfer data or said compressed data to said data transferring section;
- said state-of-transfer detecting section being operable to detect the state of transferring of said data transferring section based on an unoccupied capacity in said transfer-data holding section.

12. An image reading system according to claim 9, further comprising a transfer-data holding section for temporarily holding said transfer data or said compressed data before the transferring of said transfer data or said compressed data to said data transferring section;
- said state-of-transfer detecting section being operable to detect the state of transferring of said data transferring section based on an unoccupied capacity in said transfer-data holding section.

13. A method of reading an image borne on a support using an image reading apparatus, comprising the steps of:
- (a) reading the image in unit line data, which is composed of a predetermined number of lines of the image, for every predetermined time interval while moving the image reading apparatus on the support;
- (b) detecting an amount of relative movement of the image reading apparatus with respect to the support;
- (c) generating image data based on said unit line data upon detection of movement of the image reading apparatus in said detecting step (b), obtaining an amount of movement corresponding to said image data based on said amount of relative movement, of the image reading apparatus, detected in said detecting step (b), and generating transfer data composed of said obtained image data and said amount of movement, said transfer data including successive transfer data pieces;
- (d) intermittently thinning out at least one transfer data piece from said transfer data pieces in said transfer data, adding said amount of movement, which is contained in said thinned-out transfer data piece, to said amount of movement, which is contained in one data piece of the remaining transfer data pieces, which have not been thinned out, and generating compressed data composed of said imaged data in said one data piece and said added amount of movement; and
- (e) transferring one of said transfer data, which has been generated in said transfer data generating step (c), and said compressed data, which has been generated in said transfer data thinning-out step (d), to a destination.

14. A method of reading an image according to claim 13, further comprising the steps of:
- detecting a state of said transferring in said transferring step (e); and switching a mode of transferring in accordance with a result of said detecting in said state-of-transfer detecting step by selecting one from modes consisting of (i) a normal transferring mode in which said transfer data, which has been generated in said data generating step (c), is transferred to the destination in said transferring step (e) and (ii) a compression transferring mode in which said compressed data, which has been generated in said transfer data thinning-out step (d), is transferred to the destination in said transferring step (e).

15. A method of reading an image according to claim 14, further comprising the steps of:

if it is determined that the speed of said transferring in said transferring step (e) is equal to or smaller than the predetermined threshold value based on the result of said detecting in said state-of-transfer detecting step, selecting said compression transferring mode in said mode switching step; and transferring said compressed data to the destination in said transferring step (e).

16. A method for reading an image according to claim 13, further comprising the step of temporarily holding said transfer data or said compressed data in a transfer-data holding section of the image reading apparatus before said transferring in said transferring step (e);

the state of said transferring in said data transferring step (e) being detected based on an unoccupied capacity in the transfer-data holding section.

17. A method for reading an image according to claim 14, further comprising the step of temporarily holding said transfer data or said compressed data in a transfer-data holding section of the image reading apparatus before the transferring in said transferring step (e);

the state of said transferring in said data transferring step (e) being detected based on an unoccupied capacity in the transfer-data holding section.

18. A method for reading an image according to claim 15, further comprising the step of temporarily holding said transfer data or said compressed data in a transfer-data holding section of the image reading apparatus before said transferring in said transferring step (e);

the state of said transferring in said data transferring step (e) being detected based on an unoccupied capacity in the transfer-data holding section.

19. A method of reading an image according to claim 13, further comprising the step of, at the destination with respect to said data transferring step (e), restoring the image by reproducing said image data, in said transfer data or said compressed data, in accordance with said amount of movement in said transfer data or said compressed data.

20. A method of reading an image according to claim 14, further comprising the step of, at the destination with respect to said data transferring step (e), restoring the image by reproducing said image data, in said transfer data or said compressed data, in accordance with said amount of movement in said transfer data or said compressed data.

21. A method of reading an image according to claim 15, further comprising the step of, at the destination with respect to said data transferring step (e), restoring the image by reproducing said image data, in said transfer data or said compressed data, in accordance with said amount of movement in said transfer data or said compressed data.

22. A method of reading an image according to claim 16, further comprising the step of, at the destination with respect to said data transferring step (e), restoring the image by reproducing said image data, in said transfer data or said compressed data, in accordance with said amount of movement in said transfer data or said compressed data.

23. A method of reading an image according to claim 17, further comprising the step of, at the destination with respect to said data transferring step (e), restoring the image by reproducing said image data, in said transfer data or said compressed data, in accordance with said amount of movement in said transfer data or said compressed data.

24. A method of reading an image according to claim 18, further comprising the step of, at the destination with respect to said data transferring step (e), restoring the image by reproducing said image data, in said transfer data or said compressed data, in accordance with said amount of movement in said transfer data or said compressed data.

25. A computer-readable recording medium in which a program for reading an image borne on a support using an image reading apparatus is recorded, the image being read in unit line data, which is composed of a predetermined number of lines of the image, wherein said program instructs a computer to function as the following sections of the image reading apparatus:

an amount-of-movement detecting section for detecting an amount of relative movement of said image reading apparatus with respect to the support;

a transfer-data generating section for generating image data based on said unit line data upon detection of movement of said image reading section by said amount-of-movement detecting section, obtaining an amount of movement corresponding to said image data based on said amount of relative movement, of said image reading section, detected by said amount-of-movement detecting section, and generating transfer data composed of said obtained image data and said amount of movement, said transfer data including successive transfer data pieces;

a data compressing section for intermittently thinning out at least one transfer data piece from said transfer data pieces in said transfer data, adding said amount of movement, which is contained in said thinned-out transfer data piece, to said amount of movement, which is contained in one data piece of the remaining transfer data pieces, which have not been thinned out, and generating compressed data composed of said image data in said one data piece and said added amount of movement; and a data transferring section for transferring one of said transfer data, which has been generated by said transfer data generating section, and said compressed data, which has been generated by said data compressing section, to a destination.

26. A computer-readable recording medium according to claim 25, wherein said program further instructs the computer to function as the following sections of the image reading apparatus:

a state-of-transfer detecting section for detecting a state of the transferring of said data transferring section;

a switch section for switching a mode of the transferring by said data transferring section in accordance with a result of the detecting by said state-of-transfer detection section by selecting one from modes consisting of (i) a normal transferring mode in which said transfer data, which has been generated by said transfer-data generating section, is transferred to the destination by said data transferring section, and (ii) a compression transferring mode in which said compressed data, which has been generated by said data compressing section, is transferred to the destination by said data transferring section.

27. A computer-readable recording medium according to claim 26, wherein:
if it is determined that the speed of the transferring by said data transferring section is equal to or smaller than a predetermined threshold value based on the result of the detecting by said state-of-transfer detecting section, said switching section selects said compression transferring mode; and
said data transferring section transfers said compressed data to the destination.

28. A computer-readable recording medium according to claim 25, wherein said program further instructs the computer to function as a transfer-data holding section, of the image reading apparatus, for temporarily holding said transfer data or said compressed data before the transferring of said transfer data or said compressed data by said data transferring section;
said state-of-transfer detecting section being operable to detect the state of transferring of said data transferring section based on an unoccupied capacity in said transfer-data holding section.

29. A computer-readable recording medium according to claim 26, wherein said program instructs the computer to function as a transfer-data holding section for temporarily holding said transfer data or said compressed data before the transferring of said transfer data or said compressed data to said data transferring section;
said state-of-transfer detecting section being operable to detect the state of transferring of said data transferring section based on an unoccupied capacity in said transfer-data holding section.

30. A computer-readable recording medium according to claim 27, wherein said program a computer to function as a transfer-data holding section for temporarily holding said transfer data or said compressed data before the transferring of said transfer data or said compressed data to said data transferring section;
said state-of-transferring detecting section being operable to detect the state of transferring of said data transferring section based on an unoccupied capacity in said transfer-data holding section.

* * * * *